United States Patent
Trojosky et al.

(10) Patent No.: US 9,144,805 B2
(45) Date of Patent: Sep. 29, 2015

(54) METHOD AND DEVICE FOR PREPARING BROKEN GLASS

(75) Inventors: Mathias Trojosky, Kirchheim unter Teck (DE); Jens Hesse, Donzdorf (DE)

(73) Assignee: ALLGAIER WERKE GmbH, Uhingen (DE)

( * ) Notice: Subject to any disclaimer, the term of this patent is extended or adjusted under 35 U.S.C. 154(b) by 3 days.

(21) Appl. No.: 13/395,111

(22) PCT Filed: Sep. 23, 2010

(86) PCT No.: PCT/EP2010/005823
§ 371 (c)(1),
(2), (4) Date: May 2, 2012

(87) PCT Pub. No.: WO2011/054418
PCT Pub. Date: May 12, 2011

(65) Prior Publication Data
US 2012/0211032 A1    Aug. 23, 2012

(30) Foreign Application Priority Data
Oct. 27, 2009    (DE) .......................... 10 2009 050 819

(51) Int. Cl.
*B08B 1/02*    (2006.01)
*B03B 5/56*    (2006.01)
(Continued)

(52) U.S. Cl.
CPC . *B03B 5/56* (2013.01); *B03B 9/062* (2013.01); *B07B 4/08* (2013.01); *B03B 9/06* (2013.01);
(Continued)

(58) Field of Classification Search
CPC .......... B07B 11/00; B29B 17/02; B03B 5/56; B03B 9/06; B03B 9/061; B03B 9/062; B08B 3/02; B08B 5/02; B08B 5/304; B08B 5/023; B08B 3/041; B08B 3/042; B08B 5/00; B08B 3/04; B01D 33/11; B01D 33/13
USPC ........................... 134/6, 26, 32, 33, 34, 36, 42
See application file for complete search history.

(56) References Cited

U.S. PATENT DOCUMENTS

| 1,958,309 A | * | 5/1934 | Lockett ......................... 209/452 |
| 2,983,378 A | | 5/1961 | Hilkemeier |

(Continued)

FOREIGN PATENT DOCUMENTS

| AT | 503 036 | 7/2007 |
| DE | 80 01 449 | 4/1980 |

(Continued)

OTHER PUBLICATIONS

Zhu, et al: "The Development of an Electric Bus with Super-Capacitors as Unique Energy Storage" IEEE Xplore 2006. 4 Pgs.

(Continued)

*Primary Examiner* — Bibi Carrillo
(74) *Attorney, Agent, or Firm* — Farajami & Farajami LLP

(57) ABSTRACT

There is provided a method for processing broken glass particles subject to moisture, to which residues of stickers adhere. The method comprises receiving the broken glass particles continuously at a delivery point of a drum, transporting the broken glass particles as a stream of broken glass particles in the drum to a discharge point, wherein the stream of broken glass particles is removed from the drum, rotating the drum such that circulation and mutual friction of the stream of broken glass particles occurs, and applying a gas stream to the stream of broken glass particles and guiding the gas stream over the stream of broken glass particles to remove the residues of stickers, wherein the transporting of the stream of broken glass particles is decelerated in a bulge of the drum.

11 Claims, 2 Drawing Sheets

(51) Int. Cl.
*B07B 4/08* (2006.01)
*B03B 9/06* (2006.01)
*B07B 11/00* (2006.01)
*B29B 17/02* (2006.01)
*B08B 3/02* (2006.01)
*B08B 5/02* (2006.01)
*B08B 3/04* (2006.01)
*B08B 5/00* (2006.01)

(52) U.S. Cl.
CPC ............... *B03B 9/061* (2013.01); *B07B 11/00* (2013.01); *B08B 3/02* (2013.01); *B08B 3/04* (2013.01); *B08B 3/041* (2013.01); *B08B 3/042* (2013.01); *B08B 5/00* (2013.01); *B08B 5/02* (2013.01); *B08B 5/023* (2013.01); *B29B 17/02* (2013.01); *Y02W 30/525* (2015.05); *Y02W 30/60* (2015.05)

(56) References Cited

U.S. PATENT DOCUMENTS

| | | | |
|---|---|---|---|
| 3,991,779 A * | 11/1976 | Saurenman | 134/57 R |
| 4,018,675 A | 4/1977 | Petrucci | |
| 4,083,776 A | 4/1978 | Shimoiizaka | |
| 4,116,822 A * | 9/1978 | Webb | 209/11 |
| 4,730,934 A * | 3/1988 | Schwing | 366/40 |
| 5,289,703 A * | 3/1994 | Hiyashi et al. | 68/24 |
| 2007/0012599 A1 * | 1/2007 | Bohlig et al. | 209/12.1 |

FOREIGN PATENT DOCUMENTS

| | | |
|---|---|---|
| DE | 10 2006 032 942 | 4/2008 |
| DE | 10 2007 027 400 | 12/2008 |
| EP | 0 525 226 | 2/1993 |
| JP | 10-100061 | 4/1998 |
| JP | H 11-319791 | 11/1999 |
| JP | 2000-167487 | 6/2000 |
| JP | 2004-41995 | 2/2004 |
| JP | 2008-93513 | 4/2008 |
| KR | 10-2009-0034626 | 4/2009 |
| WO | WO 92/16686 | 10/1992 |
| WO | WO 94/12281 | 6/1994 |

OTHER PUBLICATIONS

Australian Office Action dated Oct. 31, 2014 for Australian Patent Application No. 2010314503.

* cited by examiner (Stand der Technik)

METHOD AND DEVICE FOR PREPARING BROKEN GLASS

This is a U.S. national phase application, which is based on, and claims priority from, PCT application Serial No. PCT/EP2010/005823, filed Sep. 23, 2010, which claims priority from foreign application Serial No. 10 2009 050 819.8, filed Oct. 27, 2009, in Germany.

FIELD OF THE INVENTION

The invention relates to the field of processing waste glass.

BACKGROUND

Waste glass is collected in Germany in publicly situated barrels in particular. A preselection is made in that waste glass of a specific color is only to be thrown into a specific barrel in each case. The public complies with this to a greater or lesser extent. A strict separation according to color of the glass is not achievable in this way, of course.

Waste glass consists of bottles in particular, but also can-shaped glass articles. In any case, the waste glass is afflicted with strong contamination. This includes residues of container contents, metal parts such as bottle caps, and plastic parts. Stickers such as labels are particularly unpleasant.

All of these contaminants must be removed in the course of the processing (recycling) of waste glass. The invention is concerned therewith.

The process for processing waste glass or broken glass of any type includes numerous method steps. These include, inter alia, the crushing of the glass thrown into the barrels into shards or particles. These may be the size of the palm of a hand, for example.

A further decisive method step is the separation of the glass particles into the various color fractions. The glass particles and their color are detected in the traps by optical sensors, and the measurement result controls blowing nozzles connected downstream, which in turn react selectively to the individual colors and reject incorrect colors.

Residues of stickers such as labels which adhere to the glass shards interfere in this case. Therefore, a corresponding method step for removing the stickers is connected upstream from the mentioned separation according to color. The invention is directed to this method step.

Facilities for removing the residues of stickers are known. A trough is filled with particles of waste glass. The trough contains stirrers, which revolve in the mass of the particles. The revolving results in mutual friction of the individual particles, the residues of stickers also being detached more or less well from the particles, so that they may be removed in a following step. It is known that the removal of the stickers functions better if the glass shards are as damp as possible. However, the known method is inadequate under various aspects. The stirrers are subject to a high degree of wear. The separation of the residues of the stickers from the glass particles is only incomplete.

SUMMARY

The invention is based on the object of specifying an advantageous method and a device for removing the residues of stickers adhering to glass particles, which is capable of washing and drying the glass shards in the same device.

This object is achieved by the features of the independent claims.

Essential or advantageous ideas of the invention are as follows:

Particles of broken glass are placed onto an underlay, for example, into the inner chamber of a rotating drum. Mutual friction of the glass particles is generated by the revolving movement of the drum.

In order to achieve good rearrangement and friction of the shards, the revolving drum can be equipped with fixtures.

The glass particles are wetted with water or are first wetted with water in the drum.

As the drum revolves, mutual friction of the glass particles occurs, and therefore the sticker residues detach from the glass particles.

Because the drum is continuously charged with glass particles at the placement end, the glass particles which are freed from stickers travel further in the drum to the opposite drum end.

A hot air source is located at the opposite drum end. On the one hand, the hot air dries the glass particles, on the other hand, it entrains the sticker residues and removes them, at the end of the glass drum at which the glass particles were introduced.

A device is provided to moisten the glass particles, for example, using water.

The underlay is perforated at least in the placement end for draining water.

The three following partial problems are solved using simple means by the invention:

The stickers are separated from the glass particles, and without fittings susceptible to wear, such as stirrers.

The glass particles are subsequently dried in the same device.

The separated sticker residues are simultaneously entrained by the drying air and removed to the outside.

The device, onto which the glass particles are delivered, can be designed in different ways. Thus, above all the mentioned drum comes into consideration. Furthermore, a trough as possible as the underlay. The trough is elongated and has an inlet for glass particles on its one front side, and an outlet on its other front side. Of course, if a trough is selected as the underlay, a rotation around the longitudinal axis of the trough is not possible. Another measure must be taken here to set the waste glass particles into motion with mutual friction. A shaking movement of the trough comes into consideration for this purpose, for example. The trough can also be implemented as an oscillating conveyor, which not only causes the mutual friction of the glass particles, but rather also an additional conveyor movement.

It is expedient to decelerate the traveling movement of the stream of the glass particles at the beginning of the processing section, i.e., immediately after the delivery on the underlay, in order to intensify the detachment process. This may be achieved in that if a rotatably mounted drum is used, it bulges out in the area of its placement end and therefore forms a storage space having greater diameter than the drum.

It is also conceivable to incline the drum in relation to the horizontal, so that the glass particles cover a rising pathway as they travel from the delivery point to the discharge point.

BRIEF DESCRIPTION OF THE DRAWINGS

The prior art and the invention will be explained in greater detail on the basis of the drawings. The following is shown in detail therein.

DETAILED DESCRIPTION

Figure 1:
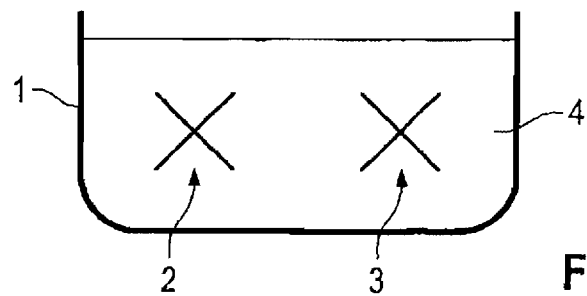
FIG. 1 shows a processing trough for detaching sticker residues.

The device according to FIG. 1 according to the prior art operates in batch mode. The device comprises a container 1 and stirrers 2 and 3 arranged therein. A specific quantity of broken glass 4 is poured into the container. The broken glass is wetted with water from the preceding washing process.

The stirrers 2, 3 revolve for a certain time span until the desired effect of the detachment of residues of stickers from the glass particles is achieved. The container is then emptied. The broken glass is processed further.

The known device only operates inadequately, because the removal of the residues of the stickers is incomplete. The stirrers 2, 3 are subject to a high degree of wear.

The device according to the invention comprises an elongated drum as the essential component. This is mounted so it is rotatable—see the rollers 6 and 7. The rotational axis of the drum 5 (not shown) extends horizontally. It could also be inclined to the horizontal.

The drum has a bulge 10 in the area of the delivery point 8. The bulge 10 forms a storage space for accommodating a greater quantity of broken glass 4. The broken glass is still wetted with water from a preceding washing process. It could also be wetted further by applying water from spray nozzles 11.

As the drum 5 revolves, a movement of the numerous broken glass particles relative to one another occurs, and therefore mutual friction. The friction results in detachment of residues of stickers from the individual particles. This detachment process occurs within the bulge 10. The particles at the end of the storage zone are therefore substantially or completely free of sticker residues.

Because of the continuous supply of broken glass to the delivery point 8, an overflow occurs of the broken glass quantity contained in the storage space. A stream of glass particles is formed, which moves in the direction toward the discharge point 9. This stream is therefore free of sticker residues.

A hot air source 12 is provided on the front side of the drum 5 on which the discharge point 9 is located. A hot air stream exits therefrom—indicated by dot-dash lines. The air stream passes over or through the mentioned glass stream, in a direction opposite to the glass stream. The hot air stream cools down on its path and dries the particles of the glass particle stream. The sticker residues separated in the storage space from the broken glass quantity 4 provided therein are entrained by the hot air stream and guided out of the drum 5, on the front side of the drum 5 shown on the right in the figure.

The drum therefore achieves the following individual objects:
It separates sticker residues from glass particles in the storage space.
It dries the cleaned broken glass stream.
It conducts the separated sticker residues with it and conveys them out of the drum 5.

Figure 2:
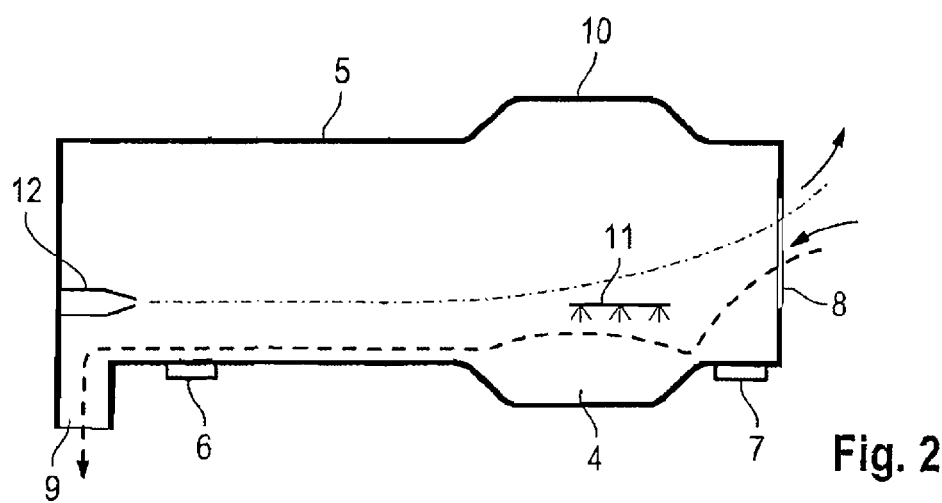
FIG. 2 shows a schematic outline view of a processing drum according to the invention according to a first embodiment.
Figure 3:
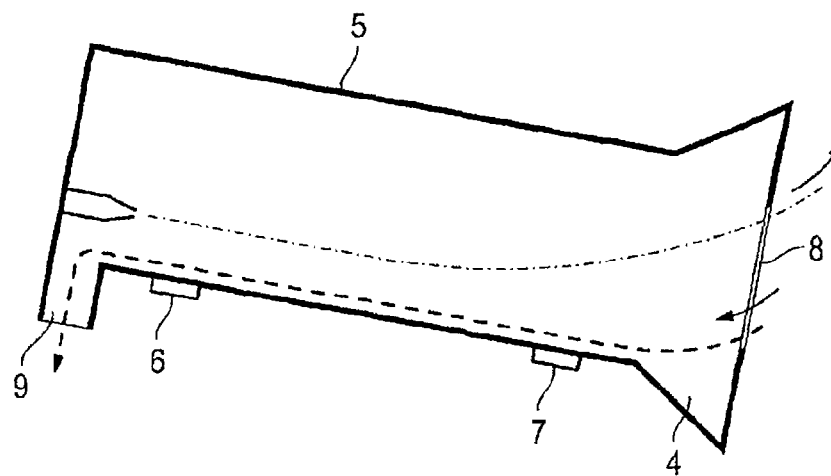
FIG. 3 shows a schematic view of a second embodiment of a drum.

In the embodiment according to FIG. 3, the drum 5 is inclined to the horizontal, in such a manner that the broken glass stream moves upward toward the discharge point 9. The drum 5 is again mounted so it is rotatable. The drum 5 is implemented as conical in the area of the discharge point. A storage space again results in this way, which accommodates a greater quantity of broken glass 4. Otherwise, the process runs precisely as in the embodiment according to FIG. 2. The sticker residues are separated from the glass particles in the storage space, and a cleaned broken glass particle stream travels to the discharge point 9, where it exits from the drum 5.

Figure 4:
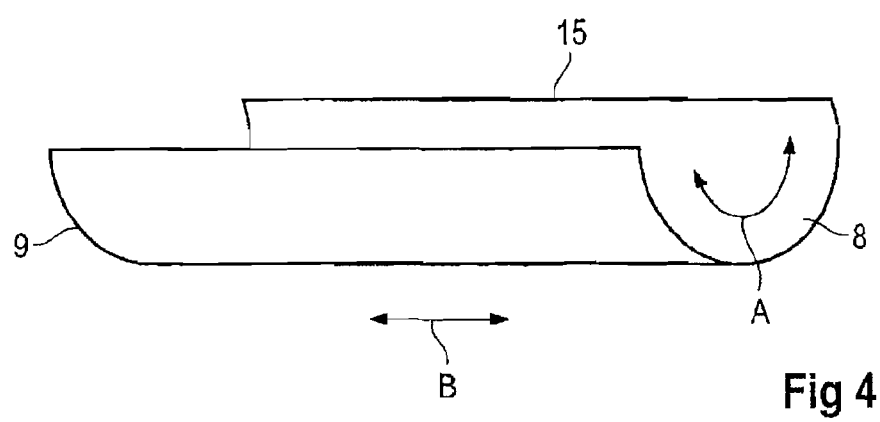
FIG. 4 shows, as a further conceivable embodiment of the invention, a shell which is open on top instead of the two drums according to FIGS. 2 and 3.

FIG. 4 illustrates a shell 15. It is functionally equivalent to the drums 5 according to FIGS. 2 and 3. The shell 15 also has a delivery point 8 and a discharge point 9. It can be provided with a storage zone, but this is not absolutely necessary. This is also true for the two drums 2 and 3. With appropriate length of the processing section between delivery point and discharge point, a relative movement can occur between the numerous broken glass particles, and therefore sticker residues can be rubbed off.

The shell 15 must also be moved in some way in such a manner that the broken glass (not shown in this case) is moved, so that mutual friction of the broken glass particles occurs.

The movement of the shell 15 can run as indicated by the double arrow A or as indicated by the double arrow B. If possible, it should run by shaking, in order to achieve the swirling effect of the glass particles. The movement can run intermittently.

The underlay—whether drum or shell—can be perforated, at least in the placement area 18, so that water which adheres to the broken glass particles or is delivered thereon can drain downward.

LIST OF REFERENCE NUMERALS 1 container
2 stirrer
3 stirrer
4 broken glass
5 drum
6 roller
7 roller
8 delivery point
9 discharge point
10 bulge
11 water nozzles
12 hot air nozzle

The invention claimed is:

1. A method for processing broken glass particles subject to moisture, to which residues of stickers adhere, the method comprising:
receiving the broken glass particles continuously entering at a delivery point of a drum;
decelerating the broken glass particles, after entering the drum, using a bulge provided in the drum, wherein the bulge is located immediately after the delivery point of the drum, and wherein a diameter of the drum in a part where the bulge is located is larger than a diameter of any other parts of the drum;
moving the broken glass particles, after the decelerating, as a stream of the broken glass particles, while rotating the drum, from the bulge of the drum toward a discharge point of the drum, where the stream of the broken glass particles exit the drum, and wherein the rotating of the drum causes a circulation and mutual friction of the stream of the broken glass particles; and
applying, while performing the decelerating and the moving, a gas stream to the broken glass particles and guiding the gas stream over the broken glass particles to remove the residues of stickers and the moisture from the broken glass particles.

2. The method according to claim 1, wherein the stream of the broken glass particles and the gas stream are oriented in an opposite direction, and wherein the gas stream includes hot air.

3. The method according to claim 1, wherein the broken glass particles receive a liquid medium upon at least one of a delivery of the broken glass particles to the drum, at the delivery point of the drum, and immediately after the delivery point of the drum.

4. The method according to claim 1, wherein the bulge forms a storage space for the broken glass particles in the drum.

5. The method according to claim 1, wherein the bulge is located closer to the delivery point of the drum than the discharge point of the drum.

6. The method according to claim 2, wherein the broken glass particles receive a liquid medium upon at least one of a delivery of the broken glass particles to the drum, at the delivery point of the drum, and immediately after the delivery point of the drum.

7. The method according to claim 2, wherein the gas stream is provided by a gas source located at an opposite end of the drum with respect to the delivery point of the drum, and wherein the gas stream exits the delivery point of the drum after moving over the broken glass particles in the bulge of the drum.

8. The method according to claim 3, wherein the gas stream includes hot air.

9. The method according to claim 4, wherein the gas stream includes hot air.

10. The method according to claim 5, wherein the gas stream includes hot air.

11. The method according to claim 7, wherein the gas stream includes hot air.

\* \* \* \* \*